United States Patent [19]
Clothier et al.

[11] Patent Number: 5,246,045
[45] Date of Patent: Sep. 21, 1993

[54] AUTOMATIC REFRIGERANT TANK VOLUME FILL CONTROL APPARATUS

[75] Inventors: Donald A. Clothier, Rancho Palos Verdes; Donald C. Richtenburg, Encino, both of Calif.

[73] Assignee: Clothier & Rose, Inc., Carson, Calif.

[21] Appl. No.: 898,433

[22] Filed: Jun. 15, 1992

[51] Int. Cl.$^5$ .............................................. B65B 3/04
[52] U.S. Cl. ........................................ 141/95; 141/98; 141/DIG. 1; 141/198; 141/65; 141/83; 141/219; 62/492; 137/429; 141/83; 141/219
[58] Field of Search ............. 141/95, 98, 198, DIG. 1, 141/65, 192, 219, 220, 227–229, 83; 62/49.2; 137/429

[56] References Cited
U.S. PATENT DOCUMENTS

| | | | |
|---|---|---|---|
| 4,360,038 | 11/1982 | Trinkwalder, Jr. | 137/429 X |
| 4,483,367 | 11/1984 | Ross, Jr. et al. | 141/95 X |
| 4,557,300 | 12/1985 | Jernberg | 141/83 X |
| 4,744,222 | 5/1988 | Murai | 62/49.2 |
| 4,887,857 | 12/1989 | VanOmmeren | 62/49.2 X |
| 4,958,665 | 9/1990 | Iwano | 141/95 |

*Primary Examiner*—Ernest G. Cusick
*Attorney, Agent, or Firm*—Thomas I. Rozsa; Dong Chen

[57] ABSTRACT

The present invention is an automatic volume fill control apparatus to be used in conjunction with a recovering device which is operable upon being electrically connected to an electrical power source. The automatic control apparatus comprises a control unit electrically interconnected between the electrical power source and the recovering device. The control unit has an electrical circuit which includes an electrical relay switch and connects with a float switch installed in a recovered refrigerant tank. The float switch is normally closed when the refrigerant tank is less than 80% filled, which causes the relay switch to be closed to establish electrical connection between the power source and the recovering device, so the filling of the refrigerant tank continues. When the refrigerant in the tank reaches 80% in volume, the float switch will be opened, which causes the relay switch to open to cut-off the electrical connection between the power source and the recovering device, so the filling process stops. This ensures the safety of the refrigerant recovering and recycling process.

32 Claims, 2 Drawing Sheets

(Section on line 3-3)

AUTOMATIC REFRIGERANT TANK VOLUME FILL CONTROL APPARATUS

BACKGROUND OF THE INVENTION

1. Field of the Invention

The present invention relates to the field of recycling apparatus for recovered environmental hazardous materials. More particularly, the present invention relates to the field of apparatus for controlling the filling of recycling storage tanks with recovered refrigerant used in refrigeration equipment.

2. Description of The Prior Art

Most commercial, industrial, residential and automotive air conditioning and refrigeration equipment operate with various types of refrigerants. The most common types of refrigerants are Chloro-Fluoro-Carbon ("CFC"), Hydro-Chloro-Fluoro-Carbon ("HCFC") and Hydro-Fluoro-Carbon ("HFC"), including commercial refrigerant products, such as R-11, R-12., R-22, R-500, R-502 and R-134a.

In early air conditioning and refrigeration equipment, the refrigerants such as CFC are disposed after they have been used for a certain period of time, and residuals of refrigerants are often directly vented to the atmosphere. Due to the increased awareness of the hazardous effect of CFC to the environment, for example the general effect of ozone depletion in the atmosphere and particularly the "green house" or global warming effect, stricter environmental protection legislation and regulations now require that the refrigerants must be recovered and recycled.

The refrigerants from commercial, industrial, residential and automotive air conditioning and refrigeration systems are collected and recovered through refrigerant recovery devices. Particulates, moisture, acid and other substances are removed and the refrigerants and processed into useable condition. Recovering tanks are utilized in the process of the refrigerant recovery for containing, transportation and recycling purposes.

A typical refrigerant recycling tank should be filled up to 80% full, and any more filling above that level is dangerous for storage and transportation due to the possibility of tank rupture. However, the majority of refrigerant recycling tanks available on the market today usually do not have any self-contained gauge, which makes it difficult to control the fill-up level. On the one hand, the recycling tanks should not be over-filled with recovered refrigerant because that is dangerous. On the other hand, the recycling tanks should not be under-filled with recovered refrigerant because that is inefficient.

In prior art, this problem is solved mainly by two methods. One method is to connect a sensing gauge in series with the inlet hose from a recovery unit. This method requires that the operator of the refilling process constantly observe the readings on the gauge and then manually terminate the process when the gauge reaches a critical reading. Another prior art method is to place the refrigerant recycling tank on a weighing scale and observing the weight of the tank while it is filled-up. The maximum allowable gross weight will be 80% of the water capacity weight of the refrigerant plus the tare weight of the tank. One problem with this method is that the empty tanks weigh different amounts. The operator must weigh the empty tank, calculate the weight of the tank when it is eighty percent (80%) full, and then set an appropriate cutoff point. This process is subject to operator error and is also time consuming.

The prior art manual control method has many disadvantages, including reducing the efficiency of the process and increasing the inaccuracy due to human error. It is desirable to have a refrigerant recycling tank equipped with protective devices, which can automatically terminate the flowing of refrigerant from the recovery unit to the tank when the latter is 80% full.

SUMMARY OF THE INVENTION

The present invention is an automatic refrigerant tank volume fill control apparatus. It includes a self-stand automatic control unit and a float switch installed onto a refrigerant recycling tank.

It is known that in refilling the recycling tanks with recovered refrigerant, it is important to not over fill the recycling tank to more than 80% full because of the safety concern. However, it is also important to not under-fill the recycling tanks because of the efficiency concern. Prior art approaches in solving this problem generally utilize a gauge to sense the pressure of a recycling tank. This method requires the manual operation of shutting-off the filling process.

The primary object of the present invention is therefore to provide an apparatus which can automatically sense the refilling process of a refrigerant recycling tank, and terminate the refilling process when the recycling tank is about 80% full of recovered refrigerant.

It has been discovered, according to the present invention, that since the recovered refrigerant is pumped into the recycling tank by the recovering device, the simplest way to terminate the flow of recovered refrigerant from the recovery device to the recycling tank is to shut-off the recovery device so it is no longer operative. Therefore, one of the objects of the present invention is to provide an automatic control unit for the recovery device so that the recovery device is energized through and can be switched off by the automatic control unit.

It has also been discovered, according to the present invention, that since whether the recycling tank is over or under filled relates to the volume of the refrigerant contained inside the tank, the most direct way to sense the filling status of the recycling tank is to measure the surface of the refrigerant filled in the tank. Therefore, another one of the objects of the present invention is to provide a self-contained float switch to the recycling tank, so that the surface of the refrigerant filled in the tank is constantly detected.

It has further been discovered, according to the present invention, that since it is desirable to stop the refilling process when the recycling tank is about 80% filled with recovered refrigerant, the quickest way to stop the refilling process is to actuate the automatic control unit by the float switch. Therefore, an additional object of the present invention is to provide an electric circuit in the automatic control unit, which allows the control unit to be actuated automatically by the float switch.

Described generally, the present invention is an automatic volume fill control apparatus used together with a recovering device. The automatic control apparatus comprises a control unit electrically interconnected between an electrical power source and the recovering device. The electrical circuit of the control unit includes an electrical relay switch and a float switch which is installed in a refrigerant recycling tank. The float switch is normally closed when the refrigerant tank is less than 80% filled, which causes the relay switch to be closed to establish electrical connection between the power source and the recovering device, so the filling process continues. When the refrigerant in the tank reaches 80% in volume, the float switch will be opened, causing the relay switch to open, which in turn cuts-off the electrical connection between the power source and the recovering device, so the filling process stops. This mechanism guarantees the safety of the refrigerant recycling tank.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
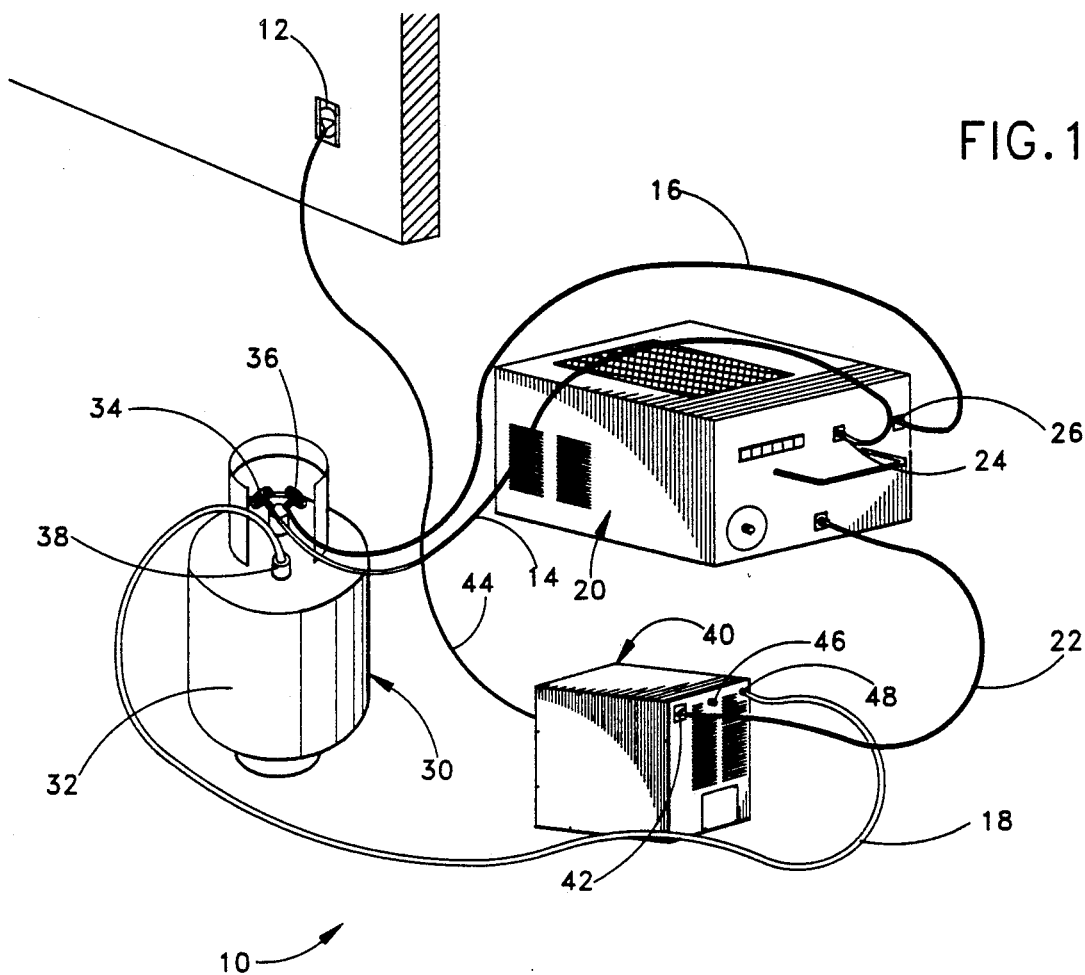
FIG. 1 is a perspective view of the system arrangement of the present invention automatic refrigerant tank volume fill control apparatus.

Referring to FIG. 1, there is shown at 10 a system arrangement of the present invention automatic refrigerant tank volume fill control apparatus. The present invention is designed to work with an existing refrigerant recovery and recycling device 20. Typically, the refrigerant recovering and recycling device 20 has a power cable 22 which is going to be plugged into an electrical wall outlet such as the one shown in FIG. 1 at 12 or any convenient electrical power source (usually 115 volts 60 hertz). It also has an inlet valve 24 and an outlet valve 26 for cycling the refrigerant. Used refrigerant is pumped into the recovering device 20 through inlet valve 24 and processed. Recovered refrigerant is pumped out of the recovering device 20 through outlet valve 26 and into a refrigerant recycling tank 30.

The main part of the refrigerant recycling tank 30 is a hollow cylinder 32 for retaining recovered refrigerant. At the top of the cylinder 32 there are an outlet valve 34 and an inlet valve 36. The outlet valve 34 of the recycling tank 30 is connected to the inlet valve 24 of the recovering device 20 through a first hose 14, and the inlet valve 36 of the recycling tank 30 is connected to the outlet valve 26 of the recovering device 20 through a second hose 16. Of course the first hose may be permanently attached to the inlet valve 24 of the recovering device 20 and becomes part of the recovering device 20, and the second hose may be permanently attached to the outlet valve 26 of the recovering device 20 and also becomes part of the recovering device 20.

The present invention refrigerant recycling tank 30 is different from the conventional refrigerant recycling tanks in that present invention refrigerant recycling tank 30 has a self-contained float switch 38 installed at the top of the cylinder 32. The float switch 38 is electrically connected to the present invention automatic control unit 40 through an electrical cable 18.

The present invention automatic control unit 40 is the heart of present invention. It has a power outlet socket 42, a power inlet cable 44, a power indicator 46 and a sensor cable socket 48. Of course the electrical cable 18 again may be permanently attached to the sensor cable socket 48 of the automatic control unit 40 and becomes part of it.

One of the primary functions of the automatic control unit 40 is to intercept the electrical connection between the wall outlet 12 and the refrigerant recovering device 20. Instead of having the power cable 22 of the recovering device 20 plugged into the wall outlet 12, the power cable 44 of the automatic control unit 40 is now plugged into the wall outlet 12, and the power cable 22 of the recovering device 20 is plugged into the power outlet socket 42 of the automatic control unit 40. This arrangement guarantees that the electrical power supply of the refrigerant recovering device 20 is now controlled by the automatic control unit 40.

Figure 2:
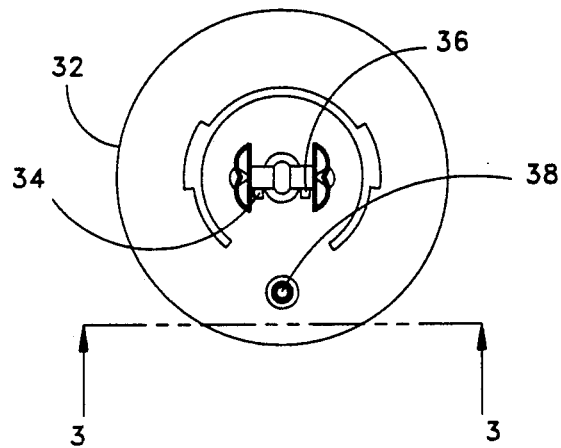
FIG. 2 is a top plan view of the present invention refrigerant recycling tank with self-contained float-switch.
Figure 3:
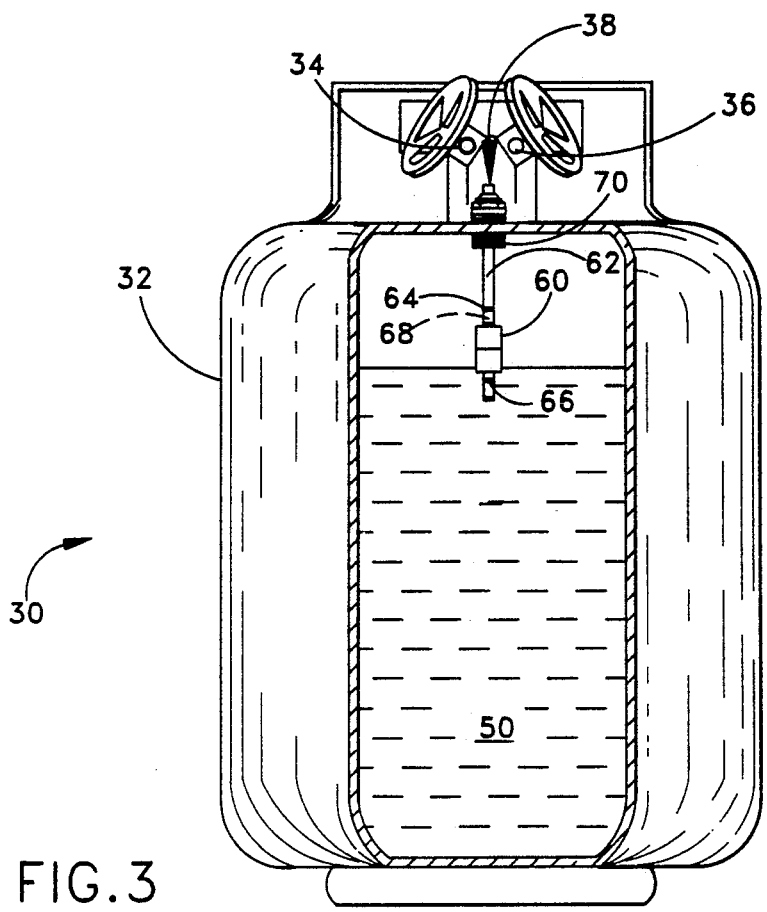
FIG. 3 is a cross-sectional view taken along line 3—3 of FIG. 2.

Referring to FIGS. 2 and 3, there is illustrated the detailed configuration of the present invention refrigerant recycling tank 30 and its self-contained float switch 38. The primary function of the float switch 38 is to sense the volume level of the recovered refrigerant 50 contained in the cylinder 32. Therefore, any suitable means which can perform such function may be embodied into the present invention refrigerant recycling tank 30. The following description is one possible embodiment of such sensing means.

The main portion of the float switch 38 is retained inside the hollow cylinder 32. It includes a hollow cylindrical float 60 attached to a vertical hollow shaft 62. The float 60 is slidable on the vertical shaft 62 between two stopping rings: an upper ring 64 and a lower ring 66. A magnetic reed switch 68 is installed inside the shaft 62 between the two stopping rings and corresponding to a predetermined volume level, such as approximately 80%, of the recovered refrigerant 50 filled inside the cylinder 32. The shaft is mounted to the top of the cylinder 32 by a socket 70 which is adaptable with the sensor cable 18. Washers or other proper sealing members may be used in mounting the socket 70 for preventing any possible leakage of the refrigerant 50. The maximum travel distance of the float 60 is approximately ½ inch. However, the positions of the stopping rings 64 and 66 and the reed switch 68 are precisely calibrated. The float 60 contains magnetic material which can trigger the reed switch 68. When the volume of the refrigerant 50 inside the cylinder 32 is below 80%, the float 60 is resting on the lower ring 66 and offset from the reed switch 68, which in turn remains closed. However, as the volume of the refrigerant 50 contained inside the cylinder 32 approaches 80%, the float 60 starts to move upwardly with the level of the refrigerant 50. When the volume of the refrigerant 50 contained inside the cylinder 32 reaches 80%, the float 60 will travel approximately ⅛ to 3/16 inch and aligned with the reed switch 68 contained inside the shaft 62. This will immediately trigger the switch to open and the filling process will stop automatically because of the proper function of the control unit 40.

Figure 4:
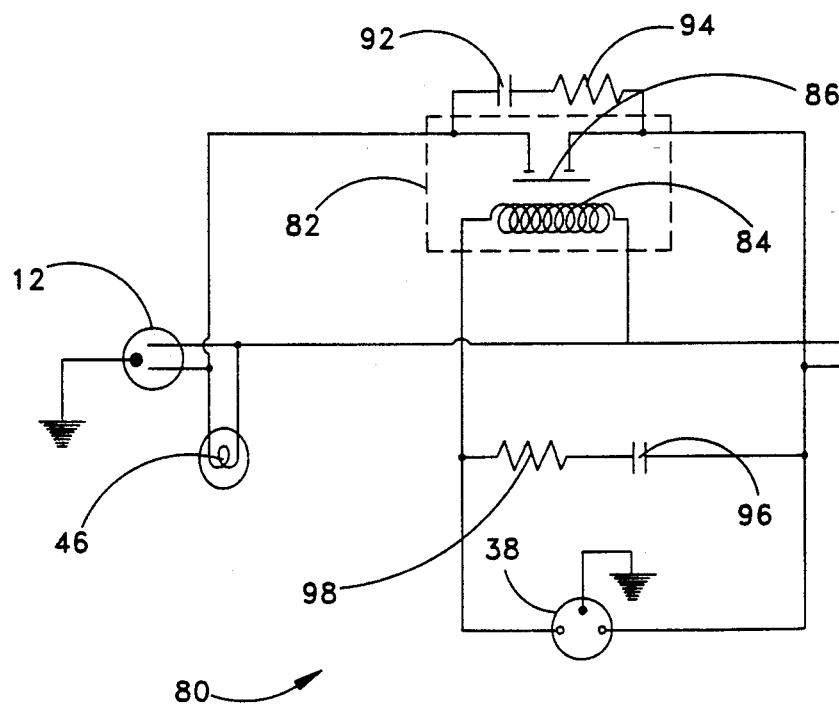
FIG. 4 is a diagram illustrating the electrical circuitry of the present invention automatic control unit.

Referring to FIG. 4, there is shown the electrical circuitry 80 of the present invention automatic control unit 40. The float switch 38 is electrically connected to the automatic control unit 40 by electrical cable 18, therefore it is part of the electrical circuitry 80 of the present invention. The electrical circuitry 80 is electrically connected to the wall outlet 12 (by power cable 44). It is also electrically connected to the power outlet socket 42 of the automatic control unit 40, which receives the power cable 22 of the refrigerant recovering device 20. The electrical circuitry 80 includes a light indicator 46, so that as soon as the control unit 40 is connected to the power outlet 12, the indicator 46 will light up to indicate the power-on status of the control unit 40. The electrical circuitry 80 also includes a single-pole-single-throw (SPST) normally open electrical relay switch 82. The coil 84 of the SPST relay 82 is connected in series with the float switch 38.

When the volume of the recovered refrigerant 50 contained in the recycling tank 30 is below the predetermined level which keeps the float switch 38 in the closed condition, the coil 84 will be energized, which in turn will cause the contact 86 to switch on, to thereby establish electrical connection between the wall outlet 12 and the power output socket 42, which in turn will energize the refrigerant recovering device 20. When the volume of the recovered refrigerant 50 contained in the recycling tank 30 reaches the predetermined level which causes the float switch 38 to be open, the coil 84 will be de-energized, which in turn will cause the contact 86 to switch off, to thereby cut off the electrical connection between the wall outlet 12 and the power output socket 42, which in turn will de-energize the refrigerant recovering device 20. Therefore, the control unit 40 operates as an automatic switch which stops the operation of the refrigerant recovering device 40 as soon as the recycling tank is filled with a predetermined volume of recovered refrigerant.

The electrical circuitry 80 of the present invention automatic control unit 40 also includes means for suppressing high frequency sparks to protect the contact 86 of the SPST relay 82. This suppressing means is an electric path connected in parallel to the contact 86 of the SPST relay 82, which includes a capacitor 92 and a resistor 94 connected in series. The capacitor 92 may be a 0.1 microfarad 60 cycles per second capacitor, and the resistor 94 may be a 100 ohm ¼ watt resistor. An additional suppressing means is also provided to protect the float switch 38 from high frequency sparks. The additional suppressing means is an electric path connected in parallel to the float switch 38, which also includes a capacitor 96 and a resistor 98 connected in series. Similarly, the capacitor 96 may be a 0.1 microfarad 60 cycles per second capacitor, and the resistor 98 may be a 100 ohm ¼ watt resistor.

The present invention has many advantageous features, including: (a) it provides an automatic control apparatus which can automatically sense the filling process of the refrigerant recycling tank, and terminate the process when the volume of the recovered refrigerant in the recycling tank reaches a predetermined level, such as 80%; (b) it provides an automatic control unit for the conventional recovery device for automatically switching on or off the conventional recovery device; (c) it provides a self-contained float switch installed on the recycling tank for constantly sensing the volume fill of the recovered refrigerant; (d) it provides an electric circuit to the automatic control unit which allows the control unit to be actuated automatically by the float switch. In addition, the present invention automatic control unit 40 is light weight and compact in size, which provide great convenience for field operators. Furthermore, the manufacturing and maintenance of the present invention apparatus are very simple and easy, and involves very low cost.

Defined in detail, the present invention is an automatic refrigerant tank volume fill control apparatus to be used in a refrigerant recovering and recycling process in conjunction with a refrigerant recovering device which is operable upon the establishment of electrical connection between the recovering device and an electrical power source, the control apparatus comprising: (a) a recycling tank for retaining a recovered refrigerant received from said recovering device; (b) a switching unit electrically interconnected between said electrical power source and said recovering device; (c) said switching unit having an electrical circuit which includes a single-pole-single-throw electrical relay, the electrical relay being normally open which causes electrical disconnection between said electrical power source and said recovering device; (d) a float switch installed in said recycling tank, the float switch being normally closed when said tank is less than approximately 80% filled in volume with said recovered refrigerant, but automatically becoming open when said recycling tank is approximately 80% filled in volume with said recovered refrigerant; and (e) means for electrically connecting said float switch of said recycling tank to said electrical circuit of said switching unit, such that when said float switch is closed, said relay is also closed for establishing electrical connection between said electrical power source and said recovering device, and when said float switch is open, said relay is caused to be open for causing electrical disconnection between said electrical power source and said recovering device; (f) whereby when electrically disconnected from said electrical power source, said recovering device will stop operating so that said recycling tank is not more than approximately 80% filled in volume with said recovered refrigerant, which ensures the safety of said refrigerant recovering and recycling process.

Defined broadly, the present invention is an automatic refrigerant container volume fill control apparatus to be used in a refrigerant recycling process in conjunction with a refrigerant recovering device which is operable upon the establishment of electrical connection between the recovering device and an electrical power source, the control apparatus comprising: (a) a recycling container for retaining a refrigerant received from said recovering device; (b) a control unit electrically interconnected between said electrical power source and said recovering device; (c) said control unit having an electrical circuit which includes an electrical relay means, the electrical relay means being normally open which causes electrical disconnection between said electrical power source and said recovering device; (d) a float switch installed in said recycling container, the float switch being normally closed when the volume of said refrigerant in said recycling container is below a predetermined level, but automatically becoming open when the volume of said refrigerant in said recycling container reaches the predetermined level; and (e)

means for electrically connecting said float switch of said recycling container to said electrical circuit of said control unit, such that when said float switch is closed, said electrical relay means is also closed for establishing electrical connection between said electrical power source and said recovering device, and when said float switch is open, said electrical relay means is caused to be open for causing electrical disconnection between said electrical power source and said recovering device; (f) whereby when electrically disconnected from said electrical power source, said recovering device will stop operating so that the volume of said refrigerant in said recycling container is not over said predetermined level, which ensures the safety of said refrigerant recycling process.

Defined more broadly, the present invention is an automatic volume fill control apparatus to be used in conjunction with a recovering device which is operable upon being electrically connected to an electrical power source, comprising: (a) a container for retaining a chemical solution received from said recovering device; (b) a control unit electrically interconnected between said electrical power source and said recovering device; (c) said control unit having an electrical circuit which includes an electrical switch means, the electrical switch means being able to cause electrical disconnection between said electrical power source and said recovering device; (d) means installed in said container for sensing automatically the volume of said chemical solution in said container; (e) means for electrically connecting said sensing means to said electrical circuit of said control unit for establishing electrical connection between said electrical power source and said recovering device when the volume of said chemical solution in said container is below a predetermined amount; and (f) said control unit being able to terminate said electrical connection between said electrical power source and said recovering device when the volume of said chemical solution in said container reaches said predetermined amount; (g) whereby when electrically disconnected from said electrical power source, said recovering device will stop operating so that the volume of said chemical solution in said container is not over said predetermined amount, which ensures the safety of said container.

Defined alternatively, the present invention is an automatic refrigerant container volume fill control apparatus to be used in a refrigerant recycling process in conjunction with a refrigerant recovering device and a recycling container, where the recovering device is operable upon the establishment of electrical connection between the recovering device and an electrical power source, and the recycling container is used for retaining a refrigerant received from said recovering device and has a self-contained float switch which is normally closed when the volume of the refrigerant in the recycling container is below a predetermined level, but automatically becomes open when the volume of the refrigerant in the recycling container reaches the predetermined level, the control apparatus comprising: (a) means for electrically interconnecting said control apparatus between said electrical power source and said recovering device; (b) said control apparatus having an electrical circuit which includes an electrical relay means, the electrical relay means being normally open which causes electrical disconnection between said electrical power source and said recovering device; and (c) means for electrically connecting said float switch of said recycling container to said electrical circuit of said control apparatus, such that when said float switch is closed, said electrical relay means is also closed for establishing electrical connection between said electrical power source and said recovering device, and when said float switch is open, said electrical relay means is caused to be open for causing electrical disconnection between said electrical power source and said recovering device; (d) whereby when electrically disconnected from said electrical power source, said recovering device will stop operating so that the volume of said refrigerant in said recycling container is not over said predetermined level, which ensures the safety of said refrigerant recycling process.

Further defined alternatively, the present invention is an automatic volume fill control apparatus to be used in conjunction with a recovering device and a container, where the recovering device is operable upon being electrically connected to an electrical power source, and the container is used for retaining a chemical solution received from the recovering device and equipped with means for sensing automatically the volume level of the chemical solution in the container, comprising: (a) means for electrically interconnecting said control apparatus between said electrical power source and said recovering device; (b) said control apparatus having an electrical circuit which includes an electrical switch means, the electrical switch means being able to cause electrical disconnection between said electrical power source and said recovering device; and (c) means for electrically connecting said level sensing means to said electrical circuit of said control apparatus for establishing electrical connection between said electrical power source and said recovering device when the volume of said chemical solution in said container is below a predetermined amount; and (d) said control apparatus being able to terminate said electrical connection between said electrical power source and said recovering device when the volume of said chemical solution in said container reaches said predetermined amount; (e) whereby when electrically disconnected from said electrical power source, said recovering device will stop operating so that the volume of said chemical solution in said container is not over said predetermined amount, which ensures the safety of said container.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An automatic refrigerant tank volume fill control apparatus to be used in a refrigerant recovering and recycling process in conjunction with a refrigerant recovering device which is operable upon the establishment of electrical connection between the recovering device and an electrical power source, the control apparatus comprising:

a. a recycling tank for retaining a recovered refrigerant received from said recovering device;

b. a switching unit electrically interconnected between said electrical power source and said recovering device;

c. said switching unit having an electrical circuit which includes a single-pole-single-throw electrical relay, the electrical relay being normally open which causes electrical disconnection between said electrical power source and said recovering device;

d. a float switch installed in said recycling tank, the float switch being normally closed when said tank is less than approximately 80% filled in volume with said recovered refrigerant, but automatically becoming open when said recycling tank is approximately 80% filled in volume with said recovered refrigerant; and e. means for electrically connecting said float switch of said recycling tank to said electrical circuit of said switching unit, such that when said float switch is closed, said relay is also closed for establishing electrical connection between said electrical power source and said recovering device, and when said float switch is open, said relay is caused to be open for causing electrical disconnection between said electrical power source and said recovering device;

f. whereby when electrically disconnected from said electrical power source, said recovering device will stop operating so that said recycling tank is not more than approximately 80% filled in volume with said recovered refrigerant, which ensures the safety of said refrigerant recovering and recycling process.

2. The invention as defined in claim 1 wherein said float switch of said recycling tank comprises two electrical terminals which are normally closed, said float switch of said recycling tank further comprises a float attached with a shaft, where the shaft can move vertically with the float as said refrigerant is filling into said recycling tank, and the vertical movement of the shaft can cause the two electrical terminals to disconnect electrically as said recycling tank is approximately 80% filled with said recovered refrigerant.

3. The invention as defined in claim 1 wherein said means for electrically connecting said float switch of said recycling tank to said electrical circuit of said switching unit includes electrical cable means.

4. The invention as defined in claim 1 wherein said single-pole-single-throw relay is a 30 ampere single-pole-single-throw normally open relay.

5. The invention as defined in claim 1 wherein said electric circuit of said switching unit further comprises means for suppressing high frequency electrical spikes on said single-pole-single-throw relay.

6. The invention as defined in claim 5 wherein said suppressing means is a circuit path electrically connected in parallel with said single-pole-single-throw relay, the circuit path includes a capacitor and a resistor electrically connected in series.

7. The invention as defined in claim 6 wherein said capacitor is a 0.1 microfarad 60 cycles per second capacitor and said resistor is a 100 ohm ¼ watt resistor.

8. The invention as defined in claim 1 wherein said electric circuit of said switching unit further comprises additional means for suppressing high frequency electrical spikes on said float switch.

9. The invention as defined in claim 8 wherein said additional suppressing means in an additional circuit path electrically connected in parallel with said float switch, the additional circuit path includes an additional capacitor and an additional resistor electrically connected in series.

10. The invention as defined in claim 9 wherein said additional capacitor is a 0.1 microfarad 60 cycles per second capacitor and said additional resistor is a 100 ohm ¼ watt resistor.

11. The invention as defined in claim 1 wherein said switching unit further comprises electrical light means for indicating electrical connection between said electrical power source and said switching unit.

12. An automatic refrigerant container volume fill control apparatus to be used in a refrigerant recycling process in conjunction with a refrigerant recovering device which is operable upon the establishment of electrical connection between the recovering device and an electrical power source, the control apparatus comprising:

a. a recycling container for retaining a refrigerant received from said recovering device;

b. a control unit electrically interconnected between said electrical power source and said recovering device;

c. said control unit having an electrical circuit which includes an electrical relay means, the electrical relay means being normally open which causes electrical disconnection between said electrical power source and said recovering device;

d. a float switch installed in said recycling container, the float switch being normally closed when the volume of said refrigerant in said recycling container is below a predetermined level, but automatically becoming open when the volume of said refrigerant in said recycling container reaches the predetermined level; and e. means for electrically connecting said float switch of said recycling container to said electrical circuit of said control unit, such that when said float switch is closed, said electrical relay means is also closed for establishing electrical connection between said electrical power source and said recovering device, and when said float switch is open, said electrical relay means is caused to be open for causing electrical disconnection between said electrical power source and said recovering device;

f. whereby when electrically disconnected from said electrical power source, said recovering device will stop operating so that the volume of said refrigerant in said recycling container is not over said predetermined level, which ensures the safety of said refrigerant recycling process.

13. The invention as defined in claim 12 wherein said float switch of said recycling container comprises electrical terminals which are normally closed, said float switch of said recycling container further comprises a float and means attached to the float for causing the electrical terminals to disconnect electrically as the volume of said refrigerant in said recycling container reaches said predetermined level.

14. The invention as defined in claim 12 wherein said means for electrically connecting said float switch of said recycling container to said electrical circuit of said control unit includes electrical cable means.

15. The invention as defined in claim 12 wherein said electric circuit of said control unit further comprises suppressing means for protecting said electrical relay means.

16. The invention as defined in claim 15 wherein said suppressing means is a circuit path electrically connected in parallel with said float switch, the circuit path includes capacitor means and resistor means.

17. The invention as defined in claim 12 wherein said electric circuit of said control unit further comprises additional suppressing means for protecting said float switch.

18. The invention as defined in claim 17 wherein said additional suppressing means is an additional circuit path electrically connected in parallel with said float switch, the additional circuit path includes additional capacitor means and additional resistor means.

19. An automatic volume fill control apparatus to be used in conjunction with a recovering device which is operable upon being electrically connected to an electrical power source, comprising:
 a. a container for retaining a chemical solution received from said recovering device;
 b. a control unit electrically interconnected between said electrical power source and said recovering device;
 c. said control unit having an electrical circuit which includes an electrical switch means, the electrical switch means being able to cause electrical disconnection between said electrical power source and said recovering device;
 d. means installed in said container for sensing automatically the volume of said chemical solution in said container;
 e. means for electrically connecting said sensing means to said electrical circuit of said control unit for establishing electrical connection between said electrical power source and said recovering device when the volume of said chemical solution in said container is below a predetermined amount; and
 f. said control unit being able to terminate said electrical connection between said electrical power source and said recovering device when the volume of said chemical solution in said container reaches said predetermined amount;
 g. whereby when electrically disconnected from said electrical power source, said recovering device will stop operating so that the volume of said chemical solution in said container is not over said predetermined amount, which ensures the safety of said container.

20. The invention as defined in claim 19 wherein said means for electrically connecting said sensing means of said container to said electrical circuit of said control unit includes electrical cable means.

21. The invention as defined in claim 19 wherein said electric circuit of said control unit further comprises circuit means for protecting said electrical switch means.

22. The invention as defined in claim 19 wherein said electric circuit of said control unit further comprises additional circuit means for protecting said sensing means of said container.

23. An automatic refrigerant container volume fill control apparatus to be used in a refrigerant recycling process in conjunction with a refrigerant recovering device and a recycling container, where the recovering device is operable upon the establishment of electrical connection between the recovering device and an electrical power source, and the recycling container is used for retaining a refrigerant received from said recovering device and has a self-contained float switch which is normally closed when the volume of the refrigerant in the recycling container is below a predetermined level, but automatically becomes open when the volume of the refrigerant in the recycling container reaches the predetermined level, the control apparatus comprising:
 a. means for electrically interconnecting said control apparatus between said electrical power source and said recovering device;
 b. said control apparatus having an electrical circuit which includes an electrical relay means, the electrical relay means being normally open which causes electrical disconnection between said electrical power source and said recovering device; and
 c. means for electrically connecting said float switch of said recycling container to said electrical circuit of said control apparatus, such that when said float switch is closed, said electrical relay means is also closed for establishing electrical connection between said electrical power source and said recovering device, and when said float switch is open, said electrical relay means is caused to be open for causing electrical disconnection between said electrical power source and said recovering device;
 d. whereby when electrically disconnected from said electrical power source, said recovering device will stop operating so that the volume of said refrigerant in said recycling container is not over said predetermined level, which ensures the safety of said refrigerant recycling process.

24. The invention as defined in claim 23 wherein said means for electrically connecting said float switch of said recycling container to said electrical circuit of said control apparatus includes electrical cable means.

25. The invention as defined in claim 23 wherein said electric circuit of said control apparatus further comprises suppressing means for protecting said electrical relay means.

26. The invention as defined in claim 25 wherein said suppressing means is a circuit path electrically connected in parallel with said float switch, the circuit path includes capacitor means and resistor means.

27. The invention as defined in claim 23 wherein said electric circuit of said control apparatus further comprises additional suppressing means for protecting said float switch.

28. The invention as defined in claim 27 wherein said additional suppressing means is an additional circuit path electrically connected in parallel with said float switch, the additional circuit path includes additional capacitor means and additional resistor means.

29. An automatic volume fill control apparatus to be used in conjunction with a recovering device and a container, where the recovering device is operable upon being electrically connected to an electrical power source, and the container is used for retaining a chemical solution received from the recovering device and equipped with means for sensing automatically the volume level of the chemical solution in the container, comprising:

a. means for electrically interconnecting said control apparatus between said electrical power source and said recovering device;
b. said control apparatus having an electrical circuit which includes an electrical switch means, the electrical switch means being able to cause electrical disconnection between said electrical power source and said recovering device; and
c. means for electrically connecting said level sensing means to said electrical circuit of said control apparatus for establishing electrical connection between said electrical power source and said recovering device when the volume of said chemical solution in said container is below a predetermined amount; and
d. said control apparatus being able to terminate said electrical connection between said electrical power source and said recovering device when the volume of said chemical solution in said container reaches said predetermined amount;
e. whereby when electrically disconnected from said electrical power source, said recovering device will stop operating so that the volume of said chemical solution in said container is not over said predetermined amount, which ensures the safety of said container.

30. The invention as defined in claim 29 wherein said means for electrically connecting said level sensing means of said container to said electrical circuit of said control apparatus includes electrical cable means.

31. The invention as defined in claim 29 wherein said electric circuit of said control apparatus further comprises circuit means for protecting said electrical switch means.

32. The invention as defined in claim 29 wherein said electric circuit of said control apparatus further comprises additional circuit means for protecting said sensing means of said container.

* * * * *